United States Patent
Doverspike

(10) Patent No.: US 7,131,792 B2
(45) Date of Patent: Nov. 7, 2006

(54) ALIGNMENT AND SUPPORT APPARATUS

(76) Inventor: Mark Doverspike, P.O. Box 69808, Odessa, TX (US) 79763

( * ) Notice: Subject to any disclaimer, the term of this patent is extended or adjusted under 35 U.S.C. 154(b) by 75 days.

(21) Appl. No.: 10/835,566

(22) Filed: Apr. 30, 2004

(65) Prior Publication Data

US 2005/0244230 A1    Nov. 3, 2005

Related U.S. Application Data

(63) Continuation-in-part of application No. 10/817,878, filed on Apr. 6, 2004, now Pat. No. 6,945,735.

(51) Int. Cl.
*F16L 1/10* (2006.01)
*F16L 3/22* (2006.01)

(52) U.S. Cl. ............ 405/184.4; 248/58; 248/68.1; 248/70; 248/74.3

(58) Field of Classification Search ............ 405/184; 248/49, 57, 58, 62, 65, 68.1, 70, 74.1, 74.3
See application file for complete search history.

(56) References Cited

U.S. PATENT DOCUMENTS

| | | | |
|---|---|---|---|
| 2,276,139 A * | 3/1942 | Hilding et al. ............ 454/331 |
| 3,385,545 A | 5/1968 | Patten | |
| 3,690,609 A | 9/1972 | Montesdioca | |
| 4,306,697 A | 12/1981 | Mathews | |
| 4,601,447 A | 7/1986 | McFarland | |
| 4,671,483 A | 6/1987 | Harbeke | |
| 4,763,867 A | 8/1988 | Hungerford, Jr. | |
| 4,907,766 A * | 3/1990 | Rinderer ............ 248/57 |
| 4,957,251 A | 9/1990 | Hubbard | |
| 5,125,619 A | 6/1992 | Collins | |
| 5,303,887 A | 4/1994 | Hasty et al. | |
| 5,876,000 A | 3/1999 | Ismert | |
| 6,047,515 A | 4/2000 | Behlen | |
| 6,061,880 A | 5/2000 | Senniger | |
| 7,039,965 B1 * | 5/2006 | Ismert ............ 4/695 |
| 2003/0108130 A1 | 6/2003 | Tucker | |

FOREIGN PATENT DOCUMENTS

| | | |
|---|---|---|
| GB | 2249604 | 5/1992 |
| JP | 6-17971 | 1/1994 |

OTHER PUBLICATIONS

"Pipe Clamps & Risers: Fabricated Riser Clamp", website: http://www.sumner.com/s/pipe/posi.html, 3 pages.*

"Pipe Support and Alignment—Sumner Manfacturing Company, Inc." http://www.pipingtech.com/products/ptpcat/support/clamp/fig190.htm, 3 pages.

"Pipe Support & Alignment", http://www.sumner.com/s/pipe/posi.html, 2 pages.*

Company literature: "HOLDRITE Pipe Positioning & Alignment Brackets", 4 pages, (Company address: HOLDRITE, 393 Enterprise Street, San Marcos, CA 92078, Toll Free: 877-HOLDRITE (465-3748).*

Company literature: "Hubbard Enterprises", "The HOLDRITE® Stout Bracket™" and other products including "HOLDRITE® Residential Pro Clamps", 5 pages.*

* cited by examiner

*Primary Examiner*—Thomas B. Will
*Assistant Examiner*—Tara L. Mayo
(74) *Attorney, Agent, or Firm*—Christopher Wood; Wood & Eisenberg, PLLC

(57) ABSTRACT

An apparatus for supporting and aligning one or more otherwise unsupported conduits in predetermined relation to a self-supported conduit.

8 Claims, 11 Drawing Sheets

ALIGNMENT AND SUPPORT APPARATUS

CROSS-REFERENCE TO RELATED APPLICATIONS

The present application is a continuation-in-part of U.S. patent application Ser. No. 10/817,878 filed on Apr. 6, 2004 now U.S. Pat. No. 6,945,735, which is hereby incorporated by reference in its entirety.

STATEMENT REGARDING FEDERALLY SPONSORED RESEARCH OR DEVELOPMENT

Not Applicable.

FIELD OF THE INVENTION

An apparatus for supporting one or more otherwise unsupported conduits or pipes at various predetermined positions in relation to a self-supporting conduit.

BACKGROUND OF THE INVENTION

Small diameter pipes and conduits require support such as vertical or horizontal support. For example, Dura-pex™ polyethylene pipes with copper transition fittings attached to the ends of the pipes; the pipes are frequently tied to vertical sewage vents using duct tape. The relatively heavy copper transition fittings cause the ends of the plastic pipes to droop thereby inducing stress in the pipes.

Some plumbers simply shim and tape lines in position. While effective in the short term, such an approach is not durable and will often allow pipe movement resulting in rattling and clanging pipes within the wall as the fresh water faucet is turned on and off.

In other instances pipe-fitting contractors tie off pipes, such as plastic pipes, to a water manifold in an attempt to provide support to the pipes (or conduits). Such attempts at supporting conduits 130 places an undesirable load on the water manifold 150 possibly leading to undesirable consequences such as cracks in what should be water tight joints. Thus, there is a need for a device that does not require a water manifold to act as a support for pipes and conduits.

On construction sites trenches are frequently dug for laying pipes and conduits. Typically, a relatively large diameter pipe is laid in a trench and one or more smaller diameter pipes or conduits are laid horizontally alongside and approximately parallel to the large diameter pipe. Duct tape or ties are often used to attach the smaller diameter pipes and conduits to the larger diameter pipe. The trenches are then filled in with earth or concrete. Pipes or conduits that are improperly attached to the larger diameter pipe might move when the trench is refilled with earth (or concrete). Also, ties are sometimes made of a dissimilar material such as metal that might damage or stress the smaller diameter pipes, particularly if they are made of plastic or metal that is dissimilar to the tie metal. Thus, there is a need for a device for attaching small diameter pipes to larger diameter pipes that decreases the likelihood of damage to the smaller diameter pipes and conduits.

Senninger (U.S. Pat. No. 6,061,880, issued May 16, 2000) noted that in installing plumbing lines it is important to secure fresh water supply lines in position against movement at the time of installing the roughed-in plumbing. This not only prevents movement of the lines when pouring light weight concrete around them or installing drywall along the wall studs, but also prevents subsequent movement and pipe rattling when operating a faucet to which the lines are connected.

U.S. Pat. No. 3,385,545 issued May 28, 1968 to Patten, describes a hanging apparatus for supporting a pair of suspended conduits in predetermined relation to a self-supported conduit consisting of a ring clamp with flanges spaced and joined by a fastener for selective securement along the self-supported conduit, a pair of ears on the ring clamp each having a pair of projections extending outwardly and joined at the extremities by a facing plate, and yokes selectively rotatably aligned with and attached to each of the ears and having arcuate offsets for engaging the suspended conduits, shanks extending from one extremity of the arcuate offsets and joined by a base, offset flanges at the other extremity of each of the arcuate offsets and spaced and joined by a fastener, and the facing plates of the years and the bases of the yokes being joined by the fasteners. The '545 apparatus is particularly suited for suspending a pair of conduits in predetermined relation to a self-supported conduit. However, there are instances where more than two conduits need to be suspended in predetermined relation to a self-supported conduit. Thus, there is a need for an apparatus that is adapted to suspend more than two conduits in predetermined relation to a self-supported conduit.

U.S. Pat. No. 5,303,887 issued Apr. 19, 1994 to Hasty, deceased, et al, describes a universal pipe support and hanger system comprising a single support member of generally I-shaped cross-section elongated in a first direction between a proximate end and a distal end, and comprising an elongated central web integrally connected with midpoints of first and second flanges extending substantially at right angles to the web, in a second direction. The proximate end has an L-shaped flange for mounting the single support member against a flat surface or a DMV in at least two orthogonal directions. Upper and lower edges of each flange comprise v-shaped cradles to support pipes extending in a third direction. A plurality of septa extend between opposed inner surfaces of said first and second flanges, on either side of the web, so as to define compartments. A plurality of mounting devices, including a novel preloaded small pipe strap, are adapted to frictionally engage a pair of septa and remain slightly in the web when mounting pipes of varying outer diameters, against one or more of said v-shaped cradles. The '887 universal pipe support and hanger system is typically attached to a pipe at a single point along each pipe's length.

Pipefix™ is used in lavatory rough-ins. The Pipefix™ holds and aligns ½" and ¾" supply lines to a waste pipe. Only 3½" of wall clearance is required to mount the Pipefix™. The Pipefix™ comprises a support that is pre-slotted to hold apart 4", 6", and/or 8" piping. The Pipefix™ attaches to 1⅜" through 6⅝" O.D. vent or waste piping by means of a stainless steel band. The Pipefix™ comes in two material options: A-503 Polystyrene (yellow in color) and A-603 ABS (orange in color). The Pipefix™ relies on a fixed waste pipe to align other pipes.

U.S. Publication Number 2003/0108130 A1 published Jun. 12, 2003 to Tucker, describes an apparatus for supporting the pipes of a plumbing system during the construction of a cement building structure. The '130 apparatus is attachable at one end to a form board and at another end to a pipe. The '130 apparatus attaches to one point along a pipe's length making the '130 device unsuitable for maintaining pipe alignment during a concrete pour.

U.S. Pat. No. 6,061,880 issued May 16, 2000 to Senninger, describes a fastener for securing one or more water supply lines to a pipe, such as a drain or vent pipe. The fastener includes a first resilient clamping element for engaging the pipe and a second resilient clamping element for engaging the water line. The second resilient clamping elements may be unitary with the first resilient clamping elements or selectively connected together by means of a connector. The elements of the '880 device are made of a resilient plastic material such as polyvinyl chloride, CPVC, or ABS by means of injection molding. While the '880 device has a role to play in securing one or more water supply lines to a pipe, such as a drain or vent pipe, the '880 device is not sufficiently rigid to prevent pipe work moving out of alignment during a concrete pour operation.

None of the above inventions and patents, taken either singly or in combination, is seen to describe the instant invention as claimed. Thus an apparatus solving the aforementioned problems is desired.

SUMMARY OF THE INVENTION

An apparatus for supporting and aligning one or more otherwise unsupported conduits in predetermined relation to a self-supported conduit.

Accordingly, it is a principal object of the invention to provide an apparatus for supporting and aligning one or more otherwise unsupported conduits in predetermined relation to a self-supported conduit.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

DETAILED DESCRIPTION OF THE PREFERRED EMBODIMENTS

The present invention is directed to an alignment and support apparatus 1000 for supporting one or more conduits 130 at various predetermined positions in approximate parallel relationship to a self-supporting conduit 122 such as a comparatively large diameter pipe, a vent or a waste pipe. In a preferred embodiment the alignment and support apparatus 1000 is configured to align conduits 130 in approximately the same common central axis plane y–y' (e.g., see FIG. 7C).

The terms "conduit support device" and "alignment and support apparatus" are hereinafter regarded as equivalent terms. The term "conduit" is intended to cover pipes and conduits. The term "pipe" is also intended to cover conduits.

Figure 1:
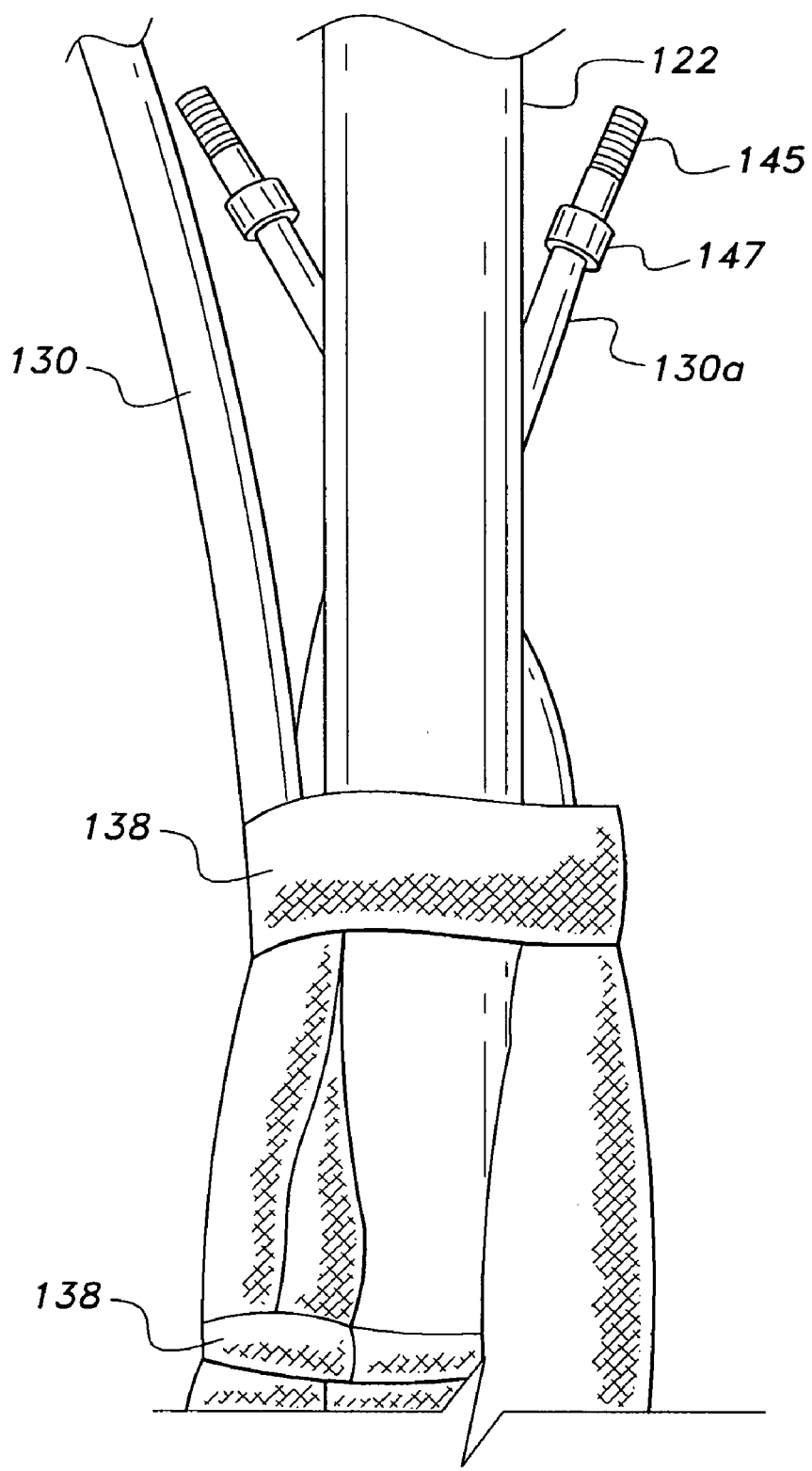
FIG. 1 shows an example of how conduits are supported in the prior art.

FIG. 1 shows a prior art perspective view in which small diameter conduits 130 are lent support by binding the conduits 130 using duct tape 138 to a self-supporting conduit 122 such as a sewage vent pipe. A polyethylene pipe (represented by label "130a") is shown fitted with a relatively heavy copper transition fitting 145 that is attached to the end 147 of the conduit 130a. The relatively heavy copper transition fitting 145 causes the plastic pipe 130a to droop thereby inducing undesirable stress in the pipe 130a. In addition, such an approach is not durable and will often subsequently allow pipe movement resulting in rattling and clanging pipes within a wall as the fresh water faucet is turned on and off.

Figure 2:
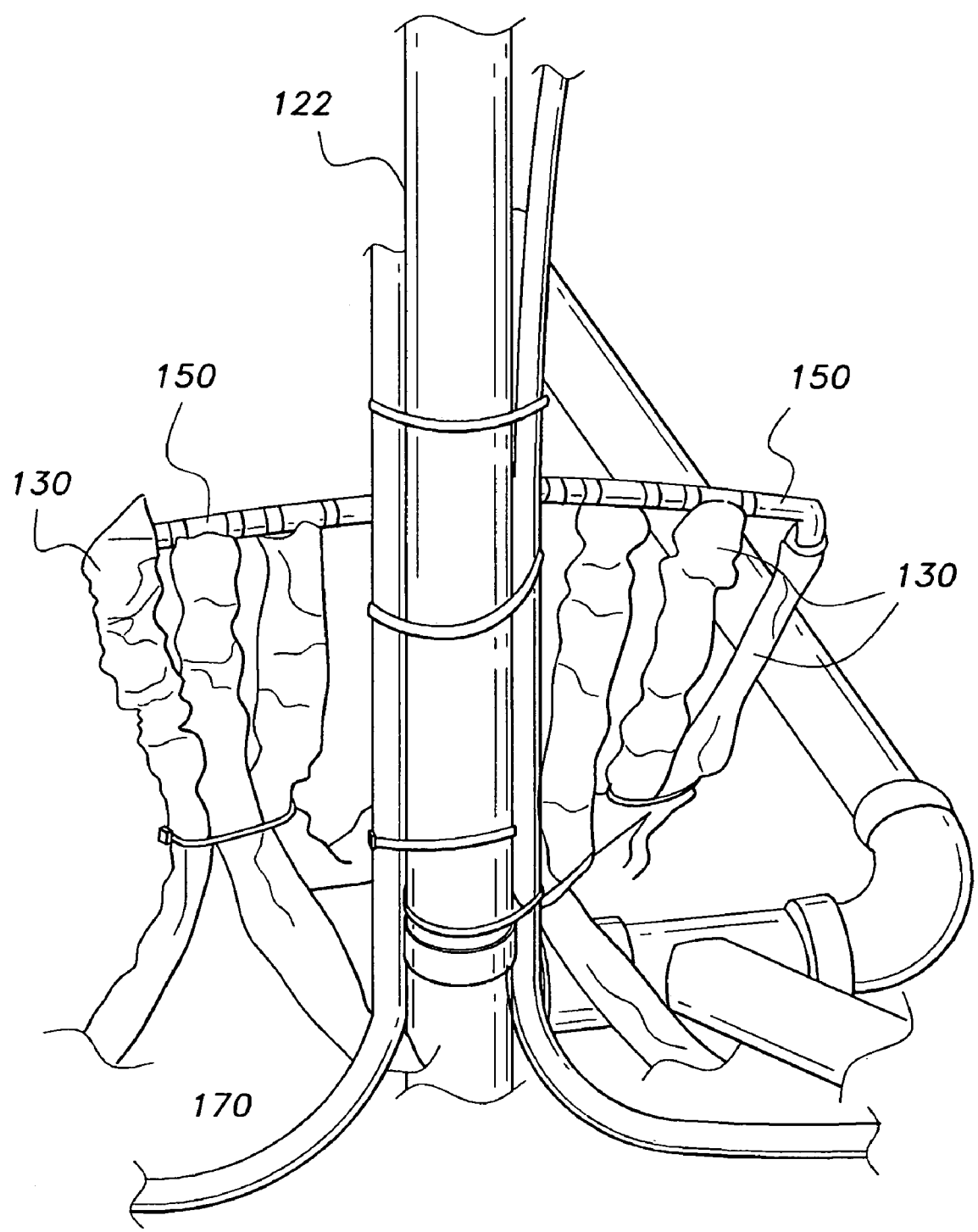
FIG. 2 shows another example of how conduits are supported in the prior art.

FIG. 2 shows another prior art perspective view in which small diameter conduits 130 are tied off to a water manifold 150. Such attempts at supporting conduits 130 often place an undesirable load on the water manifold 150 and induce cracking therein.

Figure 3:
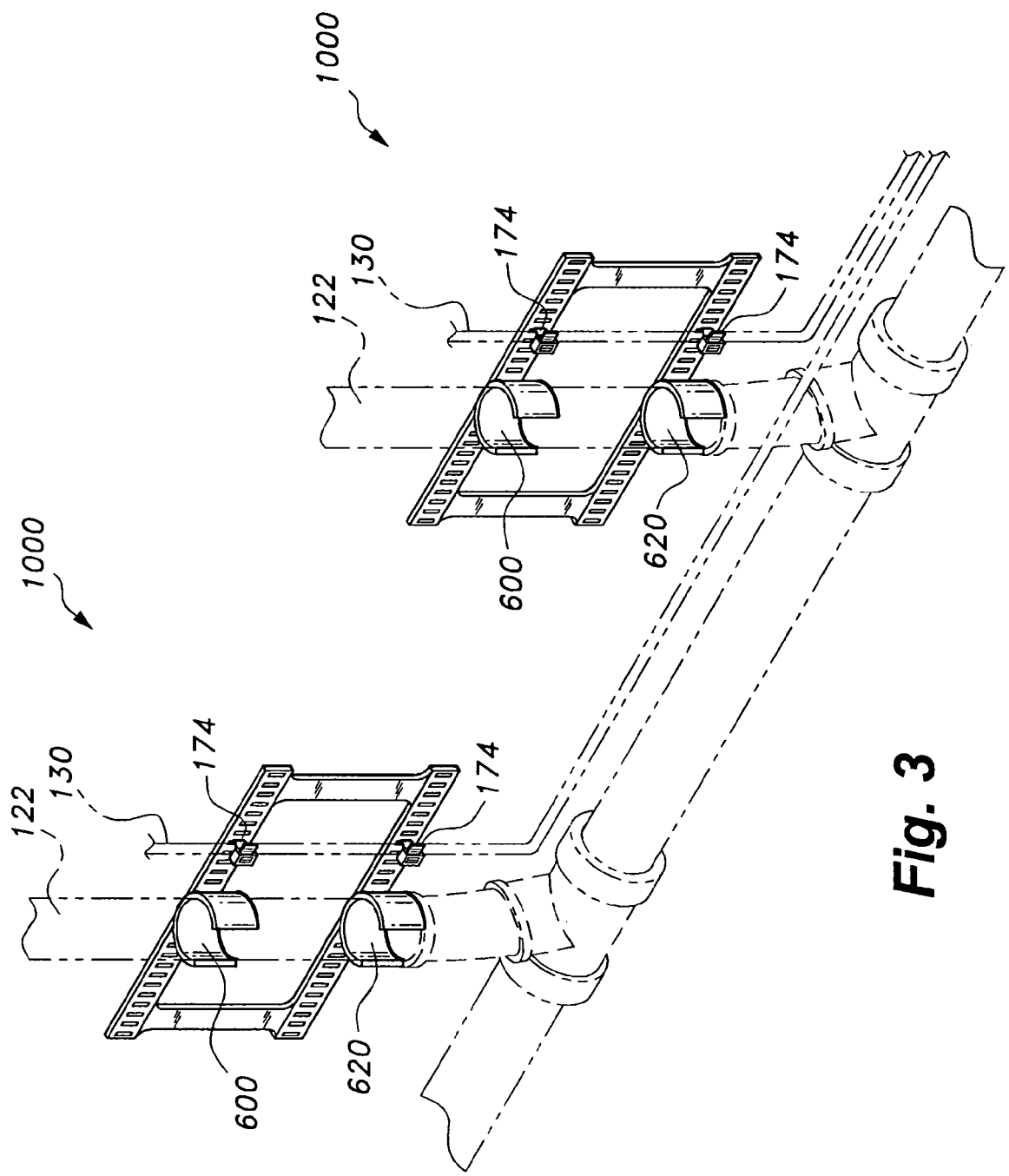
FIG. 3 is an environmental, perspective view of a conduit support device, according to the first embodiment of the invention.
Figure 4:
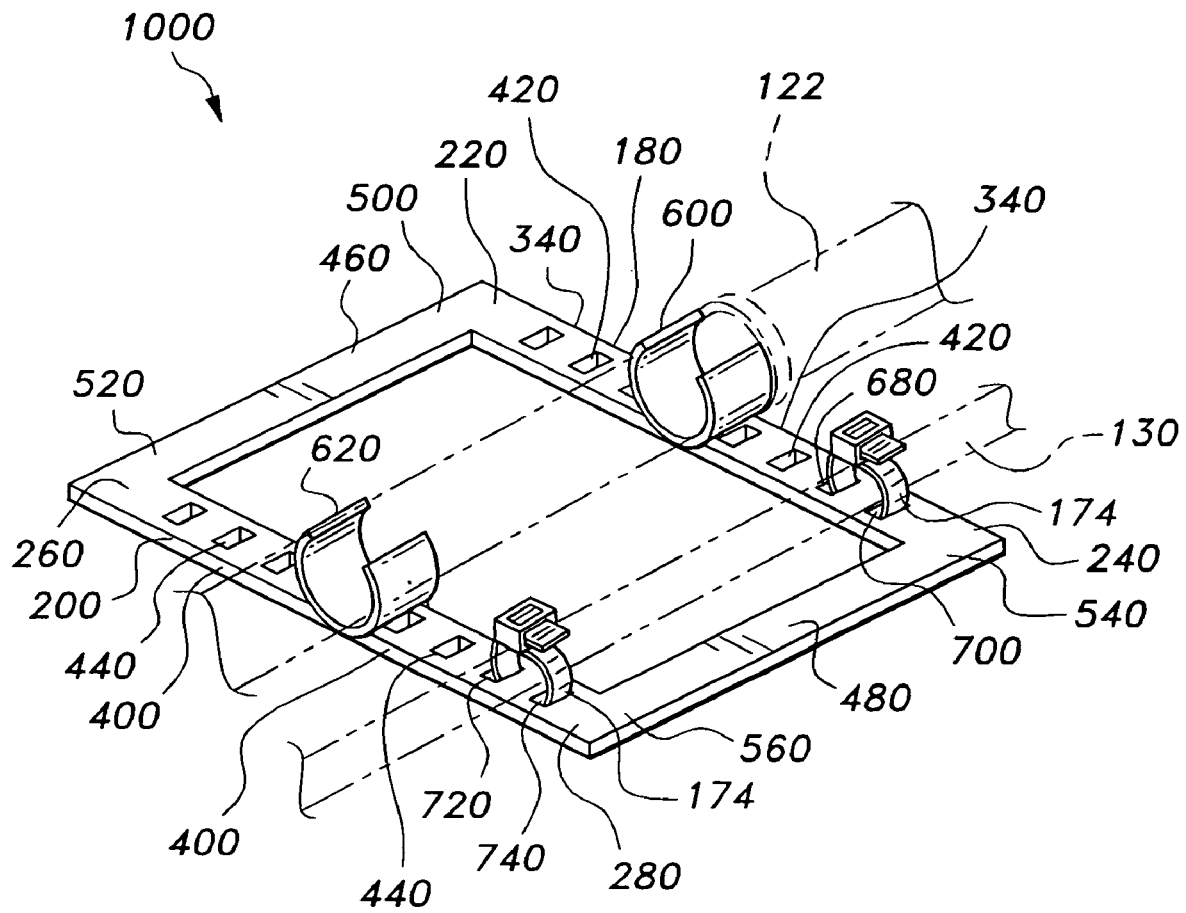
FIG. 4 is a close up perspective view of the conduit support device of FIG. 3.

FIG. 3 shows a perspective view of the device 1000 according to the first embodiment of the invention for supporting one or more conduits 130 at various predetermined positions in relation to a self-supporting conduit 122 such as a comparatively large diameter pipe, vent, or waste pipe. The device 1000 includes first 600 and second 620 outward facing pipe brackets; the brackets 600 and 620 are preferably aligned with respect to each other and are used to attach to a large diameter conduit 122 as shown in FIGS. 3 and 4. Conduits 130 are shown attached to the device 1000 by at least one tie 174. Thus, conduits 122 and 130 are attached at two points to the device 1000 thereby preventing swiveling of an attached conduit 130 about either attachment point. The conduits 130 are typically attached to the device 1000 in a parallel configuration with respect to the self-supporting conduit 130.

FIG. 4 is a perspective view of the device 1000 of FIG. 3. The device 1000 includes first 180 and second 200 elongated support members with opposed ends 220, 240, 260, and 280 as shown in FIG. 4. Opposed ends 220 and 240 define a first middle portion 340, and opposed ends 260 and 280 define a second middle portion 400. The middle portions 340 and 400 respectively define a first plurality of apertures 420 and a second plurality of apertures 440. The terms "plurality of apertures" and "array of apertures" are herein regarded as equivalent terms.

Still referring to FIG. 4, first 180 and second 200 support members are connected to each other by means of first 460 and second 480 elongated alignment members. Specifically, first elongated alignment member 460 has opposed ends 500 and 520 that are respectively connected to support members 180 and 200, and second elongated alignment member 480 has opposed ends 540 and 560 that are respectively connected to support members 180 and 200. The alignment members 460 and 480 can be parallel with respect to each other to form a perpendicular angle with respect to the first and second support members 180 and 200 such that the first 420 and second 440 arrays of apertures line up. However, it will be understood that the alignment members 460 and 480 may not be parallel so long as at least some of the apertures in arrays 420 and 440 line up to permit a construction worker to tie conduits 130 to the device 1000 using, e.g. ties 174.

The ties 174 can be threaded through selected apertures within the first and second pluralities of apertures 420 and 440, such as 680, 700, 720 and 740 (see FIG. 4), to attach, for example, a conduit 130 (shown in phantom in FIG. 4) to support members 180 and 200. It will be understood that more than one conduit 130 can be secured to the support members 180 and 200. In addition, where a pipe or conduit needs to be held steady at a selected angle this can be achieved by threading ties 174 through selected apertures in arrays 420 and 440.

Still referring to FIG. 4, the first 340 and second 400 middle portions respectively comprise first 600 and second 620 outward facing pipe brackets. The pipe brackets 600 and 620 are aligned with respect to each other to attach to a self-supported conduit 122 at two positions along its length. The pipe brackets 600 and 620 may be in the form of a snap-in wherein a self-supported conduit 122 is snapped into the brackets 600 and 620 thus providing two separate grip points such that device 1000 is held firmly attached to a self-supported conduit 122. Alternatively, the brackets 600 and 620 are made of plastic that can be glued (e.g. using a resin and hardener based glue) to the outside of a conduit 122. It will be understood that the position and number of 600 and second 620 outward facing pipe brackets may vary to allow the device 1000 to attach to more than one conduits 122, e.g. a pair of conduits 122 comprising a waste pipe and a vent conduit.

Figure 5:
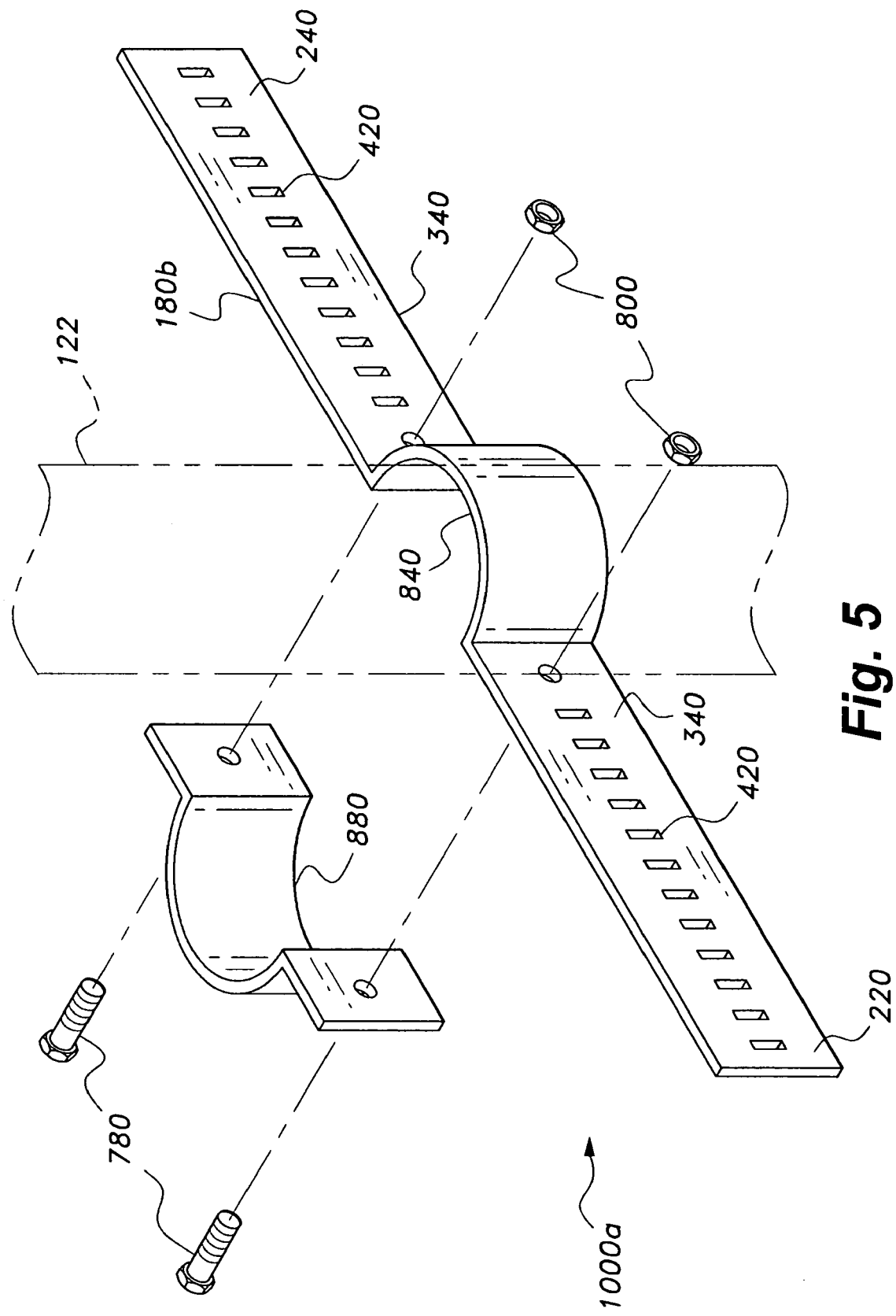
FIG. 5 is a perspective view of a conduit support device, according to the second embodiment of the invention.

FIG. 5 is a perspective view of a conduit support device 1000 (represented by alpha-numeral "1000a"), according to the second embodiment of the invention. Conduit support device 1000a comprises a single elongated substantially planar support member 180 (represented by alpha-numeral 180b). Support member 180b includes middle portion 340. The middle portion 340 includes at least one recessed inward curved surface 840 with an array of apertures 420 proximate to recessed inward surface 840. The recessed inward surface 840 is dimensioned to accommodate a section of self-supported conduit 122 (shown in phantom). The apertures 420 are spaced apart to facilitate the attachment of a plurality of otherwise unsupported conduits 130 to the first support member. An opposite facing complementary curved bracket 880 is affixed as shown in FIG. 5 using suitable fasteners such as nuts 800 and bolts 780 (shown in FIG. 7) to facilitate a tight fit around self-supported conduit 122 (shown in phantom).

Figure 6:
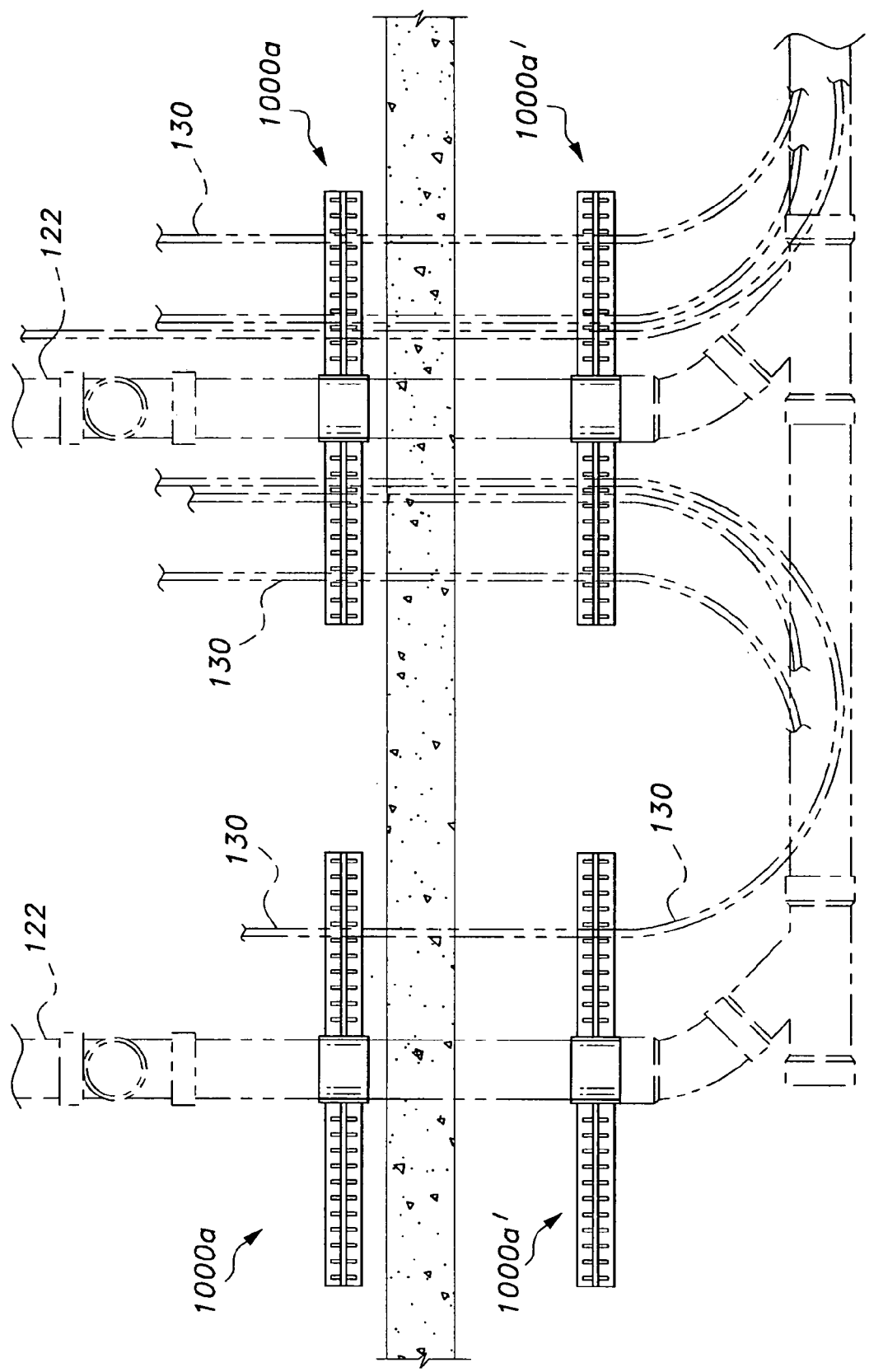
FIG. 6 is an environmental, perspective view of the conduit support device of FIG. 5.

FIG. 6 is an environmental, perspective view of the conduit support device 1000a (represented by alpha-numerals "1000a''" and "1000a'''"). The conduit support device 1000a is shown fitted in series to self-supported conduits 122. It should be understood that the device 1000a could also be used alone, i.e., as a stand-alone device.

Figure 7A:
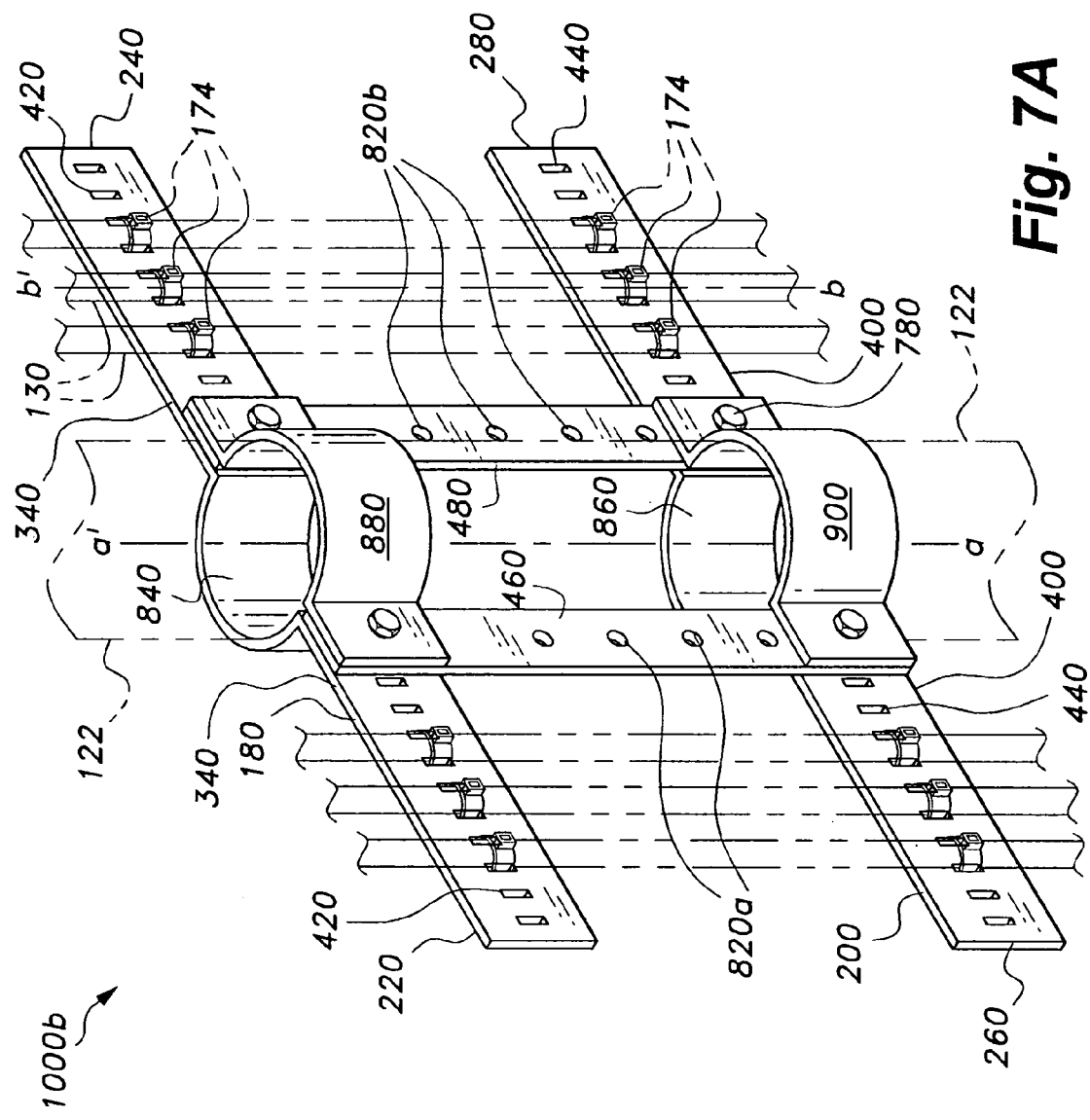
FIG. 7A is a perspective view of a conduit support device in assembled form, according to the third embodiment of the invention.
Figure 7B:
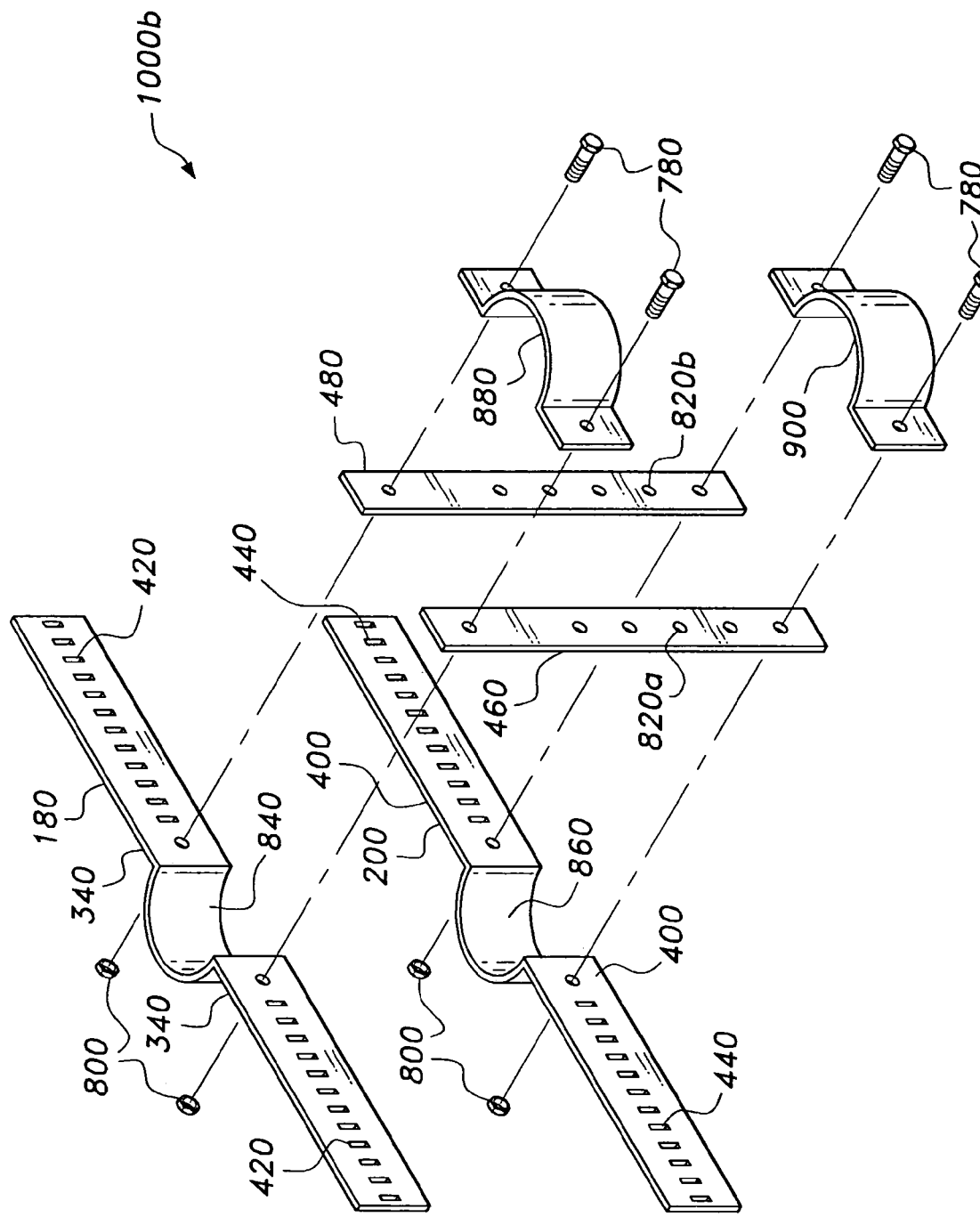
FIG. 7B is an exploded view of the conduit support device of FIG. 7A.
Figure 7C:
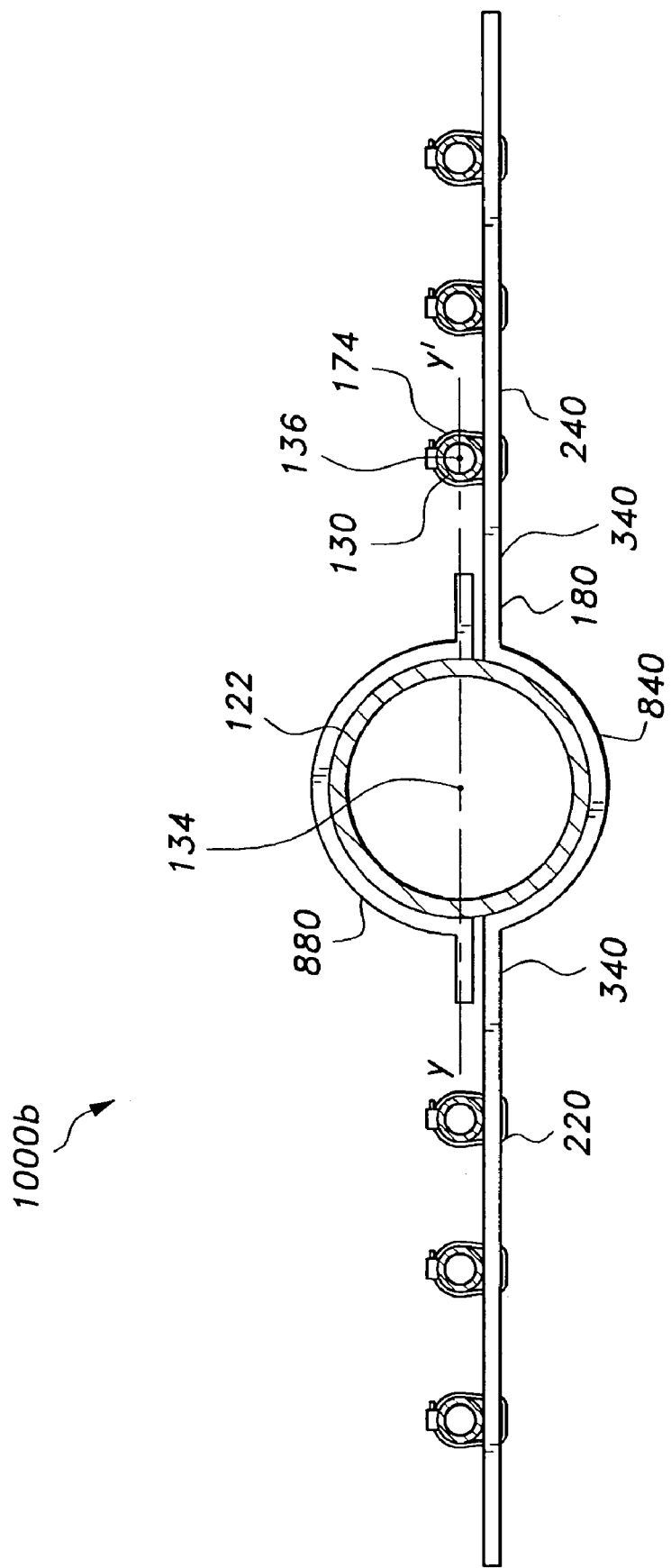
FIG. 7C is an end-on view of the conduit support device of FIG. 7A.

FIGS. 7A, 7B and 7C show a third embodiment of the invention wherein the conduit support device 1000 (represented by the alpha-numeric label "1000b") is made up of attachable components, i.e., the device 1000b is a kit. Thus, a construction worker using commonly available tools, such as an adjustable wrench, can assemble the kit 1000b from the set of components shown in FIGS. 7A and 7B. Specifically, the support members 180 and 200 and alignment members 460 and 480 are shown bolted together using bolts 780 and complementary nuts 800. In this embodiment of the invention, the alignment members 460 and 480 define a plurality of corresponding connecting apertures 820a and 820b, respectively. Thus, selecting specific apertures 820a and 820b to bolt through can vary the distance between support members 180 and 200.

Still referring to FIGS. 7A and 7B, middle portions 340 and 400 respectively include at least one recessed inward curved surface 840 and 860 dimensioned to accommodate a section of a self-supported conduit 122, e.g., the diameter of the inward curved surfaces are chosen to be sufficient to accommodate the exterior surface of member 122. Curved surfaces 840 and 860 are preferably aligned one above the other; specifically, support members 180 and 200 are connected to each other by means of alignment members 460 and 480 such that inward curved surfaces 840 and 860 line up. A self-supported conduit 122 may be tied to the inward surfaces 840 and 860 using ties threaded through selected apertures on each side of the curved surfaces 840 and 860. However, it is preferred that opposite facing complementary curved brackets 880 and 900 are affixed as shown in FIGS. 7A and 7B using suitable fasteners such as nuts 800 and bolts 780 as shown in FIG. 7B to provide a tight fit around self-supported conduit 122 (shown in phantom).

Self-supported conduit 122 and conduit 130 each respectively possess central longitudinal axes: a–a' and b–b' (see FIG. 7A). The recessed inward curved surfaces 840 and 860 can be recessed into members 180 and 200 to the extent that the central longitudinal axes a–a' and b–b' are approximately flush, i.e., occupy substantially the same central axis plane y–y' as shown in FIG. 7C; axes a–a' and b–b' are end-on and respectively represented by numerals "134" and "136". FIG. 7B is an exploded view of the device 1000b. Thus, device 1000b shown in FIGS. 7A, 7B and 7C enables a plumber to keep pipes and conduits in substantially the same central axis plane; this feature is of use, for example, in situations where self-supported pipes 122 and conduits 130 are located inside narrow spaces.

Figure 8:
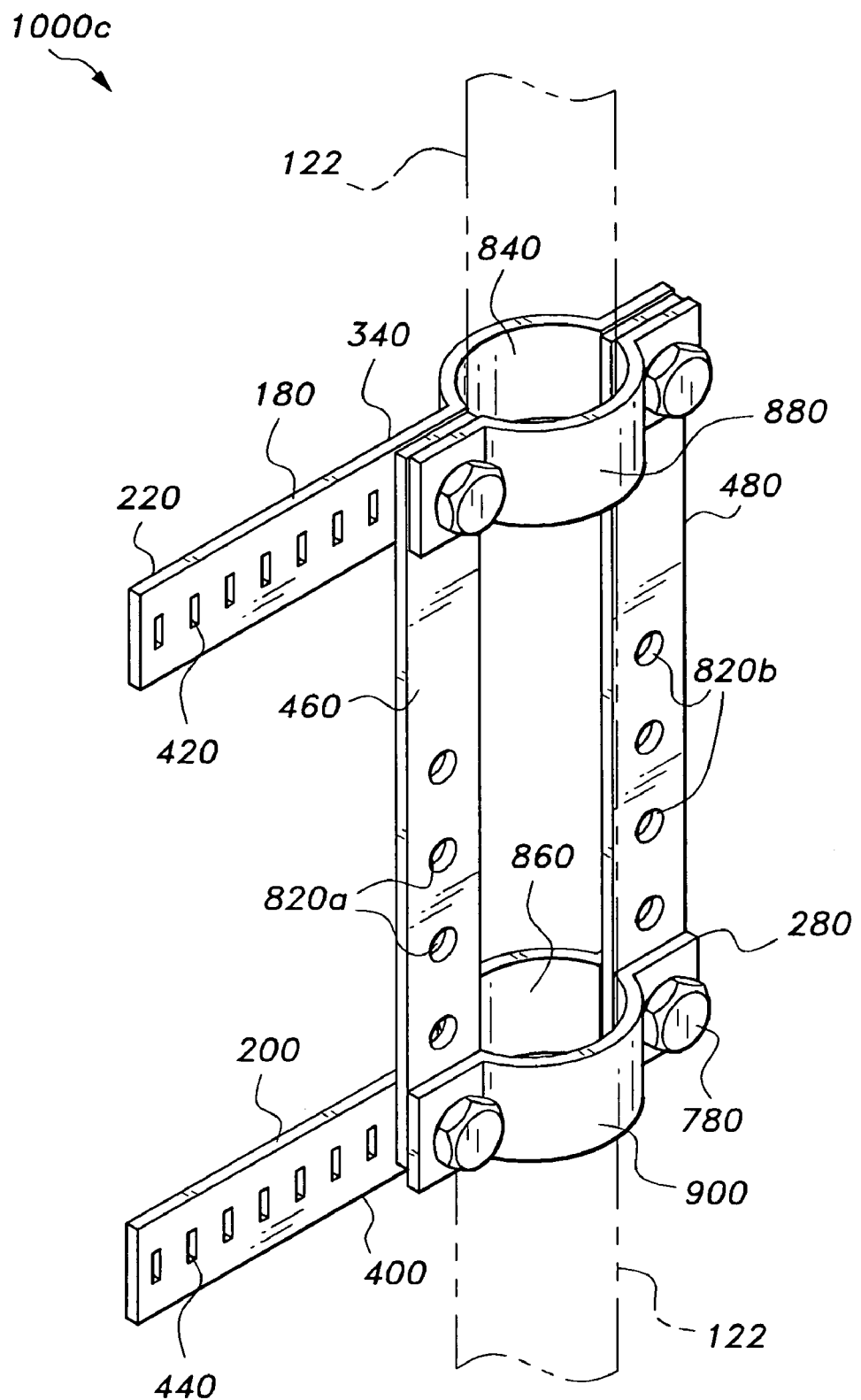
FIG. 8 is a perspective view of a variation of the conduit support device of FIG. 7A, according to the forth embodiment of the invention.

FIG. 8 shows a device 1000c, which is a variation of the device 1000b of FIG. 7A. Device 1000c is particularly suited for use in a narrow space where self-supported conduit 122 is proximate to an obstruction or corner in a building project.

Figure 9:
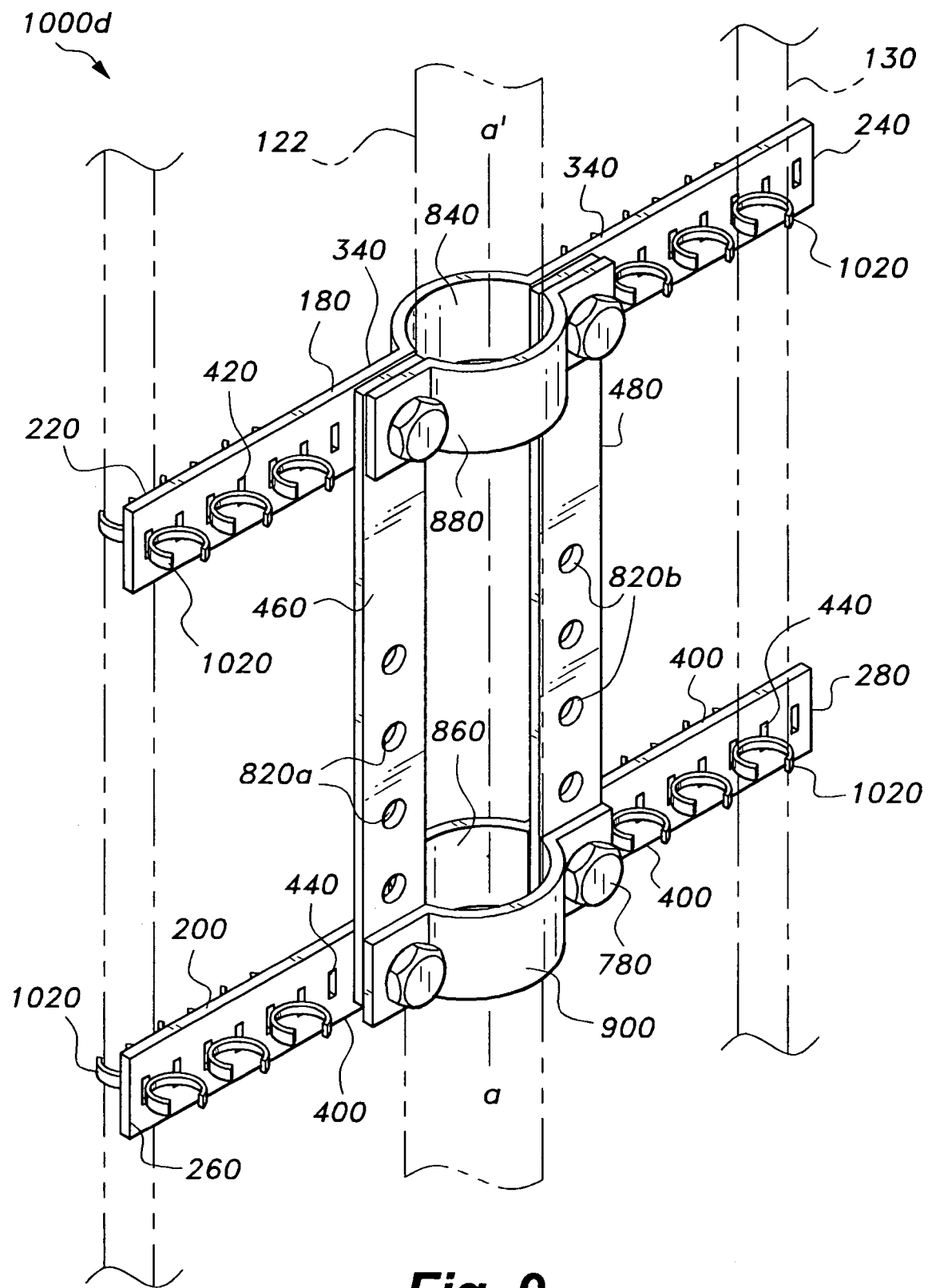
FIG. 9 is a perspective view of a further variation of the conduit support device of FIG. 7A, according to the fifth embodiment of the invention.

FIG. 9 shows a device 1000d, which is a variation of the device 1000b of FIG. 7A. The support members 180 and 200 include c-clips 1020 for gripping conduits 130. A plumber or construction worker can easily insert conduits 130 into the c-clips 1020 by, for example, pushing a conduit 130 into the c-clip 1020. The c-clips 1020 could replace apertures 420 and/or 440. For example, the c-clips 1020 could replace the apertures 420 in device 1000a (see FIG. 5). Alternatively, c-clips 1020 could partially replace the apertures 420 in device 1000a to provide a mixture of attachment members to grip conduits 130. Likewise, the c-clips 1020 could completely or partially replace aperture arrays 420 and 440 in device 1000c shown in FIG. 7A.

The position and number of inward curved surfaces 840 and 860 (and by default opposite facing complementary curved brackets 880 and 900) can vary as depicted in FIGS. 7A and 7B where curved surfaces 840 and 860 are respectively located about half way between the opposed ends of the support members 180 and 200 in contrast to device 1000c (FIG. 8) where curved surfaces 840 and 860 are respectively located close to support member ends 240 and 280.

Thus, in at least one embodiment the alignment and support device 1000a comprises at least two attachment points, such as brackets 600 and 620 or inward curved surface 840 and 860 (and complementary brackets 880 and 900) as shown in FIG. 7A. The presence of two attachment points on device 1000 helps prevent pivoting about a single attachment point as found in the prior art. It is preferred that the at least two attachment points are aligned, but the attachment points may not be aligned to cover instances where the pipe 122 or conduit 130 are angled, e.g. branch off at an angle from a vertical pipe.

Conduit support device 1000 can be made of any suitable material such as a plastic, metal, alone or in combination. For example, conduit support device 1000 shown in FIG. 3 can be made of molded plastic in one piece by an injection molding process. The component parts shown in FIG. 7B may be individually made of a metal such as lightweight aluminum, copper or steel, or made of, for example, ABS plastic (ABS, acrylonitrile-butadiene-styrene) or PVC (polyvinylchloride, e.g., 0.25 inch thick PVC) If made of metal, conduit support device 1000 may be covered in a suitable coating to prevent unwanted interactions between conduit support device 1000 and metal pipes or conduits made of a dissimilar metal. Alternatively, conduit support device 1000 may be made principally of a metal but with some parts made of plastic, e.g., the outside facing pipe brackets 600 and 620 can be made of plastic while the support members 180 and 200, and alignment members 460 and 480 made of metal. Suitable plastics include (but are not limited to): reinforced molded plastic (for example, as described in U.S. Pat. No. 5,199,131 issued Apr. 6, 1993 to Harris), and ABS.

In one form of the invention, the conduit support device comprises a first elongated support member 180, the first support member having a first attachment means such as an outward facing bracket 600 or a recessed system comprising members 840 and 880. The first attachment means is used to attach the first support member 180 to a self-supported conduit 122. The first support member 180 further comprises a second attachment means proximate to the first attachment means, whereby the second attachment means comprises a first array of attachment members such as an array of apertures 420 and/or c-clips 1020 that are spaced apart to facilitate the attachment of a plurality of otherwise unsupported conduits 130 to the first support member 180.

In another form of the invention, the conduit support device comprises a first elongated support member 180, the first support member having a first attachment means such as an outward facing bracket 600 or a recessed system comprising members 840 and 880. The first attachment means is used to attach the first support member 180 to a self-supported conduit 122. The first support member 180 further comprises a second attachment means proximate to the first attachment means, whereby the second attachment means comprises a first array of attachment members such as an array of apertures 420 and/or c-clips 1020 that are spaced apart to facilitate the attachment of a plurality of otherwise unsupported conduits 130 to the first support member 180. In this form of the invention, the conduit support device further comprises a second elongated support member 200; the second support member 200 includes a third attachment means such as an outward facing bracket 620 or a recessed system comprising members 860 and 900 for attaching the second support member 200 to a self-supported conduit 122. The second support member 200 includes a fourth attachment means proximate to the third attachment means, whereby the fourth attachment means comprises a second array of attachment members such as an array of apertures 420 and/or c-clips 102 that are spaced apart to facilitate the attachment of a plurality of otherwise unsupported conduits 130 to the second support member 200. First 460 and second 480 elongated alignment members connect the first 180 and second 200 support members such that the first 180 and second 200 support members are substantially parallel to each other and the first and third attachment means are aligned, and the first and second arrays of attachment members are at least in part aligned with respect to each other such that otherwise unsupported conduits 130 can be supported by being attached to both support members 180 and 200. Specifically, the first and third attachment means are aligned one above the other thereby permitting the conduit support device to be attached at two points to a self-supported conduit 122; and the second and third attachment means are sufficiently aligned one above the other thereby permitting otherwise unsupported conduits 130 to be attached to the support members 180 and 200.

It is to be understood that the present invention is not limited to the embodiments described above, but encompasses any and all embodiments within the scope of the following claims.

I claim:

1. A conduit support device for supporting and aligning one or more otherwise unsupported conduits in predetermined relation to a self-supported conduit, wherein the self-supporting conduit which does not form part of said conduit support device otherwise provides support to said conduit support device when attached to said conduit support device, comprising:

a first elongated support member, said first support member having a first attachment means (600) for attaching said first support member to a self-supported conduit, said first support member having a second attachment means proximate to said first attachment means, whereby said second attachment means comprises a first array of attachment members that are spaced apart to facilitate the attachment of a plurality of otherwise unsupported conduits to said first support member;

a second elongated support member, said second support member having a third attachment means (620) for attaching said second support member to the self-supported conduit, said second support member having a fourth attachment means proximate to said third attachment means, whereby said fourth attachment means comprises a second array of attachment members that are spaced apart to facilitate the attachment of a plurality of otherwise unsupported conduits to said second support member; and first and second elongated alignment members, wherein said first and second elongated alignment members connect said first and second support members such that said first and second support members are substantially parallel to each other and said first and second arrays of attachment members are sufficiently aligned with respect to each other such that otherwise unsupported conduits can be attached to both support members in a parallel configuration, wherein said first and third attachment means are aligned one above the other thereby permitting said conduit support device to be attached at two points to a self-supported conduit.

2. The conduit support device of claim 1, wherein said first and second array of attachment means take the form of a plurality of apertures in said first and second support members.

3. The conduit support device of claim 1, wherein said first and second array of attachment means take the form of a plurality of c-clips attached to said first and second support members that are spaced apart to facilitate the attachment of a plurality of otherwise unsupported conduits to said first and second support members.

4. The conduit support device of claim 3, wherein said first and second support members have first and second opposite surfaces, and wherein said conduit c-clips are spaced on either surface of said first and second support members and are spaced apart to facilitate the attachment of a plurality of otherwise unsupported conduits to said first and second support members.

5. A conduit support device for supporting and aligning one or more otherwise unsupported conduits in predetermined relation to a self-supported conduit, wherein the self-supporting conduit which does not form part of said conduit support device otherwise provides support to said conduit support device when attached to said conduit support device, comprising:

a first elongated support member, said first support member having a first bracket (600) for attaching said first support member to a self-supported conduit, said first support member having a first array of attachment means proximate to said first bracket (600), whereby said first array of attachment means are spaced apart to facilitate the attachment of a plurality of otherwise unsupported conduits to said first support member;

a second elongated support member, said second support member having a second bracket (620) for attaching said second support member to a self-supported conduit, said first (600) and second (620) brackets are in alignment with respect to each other, said second support member having a second array of attachment means proximate to said second bracket (620), whereby said second array of attachment means are spaced apart to facilitate the attachment of a plurality of otherwise unsupported conduits to said second support member; and first and second elongated alignment members, wherein said first and second elongated alignment members connect said first and second support members such that said first and second support members are substantially parallel to each other and said first and second arrays of attachment means are aligned with respect to each other such that otherwise unsupported conduits can be attached to both support members in a parallel configuration;

wherein said first and second attachment means respectively form part of said first and second elongated support members, and wherein said first and second attachment means are aligned one above the other thereby permitting said conduit support device to be attached at two points to a self-supported conduit.

6. The conduit support device of claim 5, wherein said first and second away of attachment means take the form of a plurality of apertures in said first and second support members.

7. The conduit support device of claim 5, wherein said first and second away of attachment means take the form of a plurality of c-clips attached to said first and second support members that are spaced apart to facilitate the attachment of a plurality of otherwise unsupported conduits to said first and second support members.

8. The conduit support device of claim 7, wherein said first and second support members have first and second opposite surfaces, and wherein said conduit c-clips are spaced on either surface of said first and second support members and are spaced apart to facilitate the attachment of a plurality of otherwise unsupported conduits to said first and second support members.

* * * * *